(12) United States Patent
Schink

(10) Patent No.: US 6,246,018 B1
(45) Date of Patent: Jun. 12, 2001

(54) BALANCE WITH MOTOR-DRIVEN WIND GUARD

(75) Inventor: Thomas Schink, Göttingen (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 09/430,462

(22) Filed: Oct. 29, 1999

(30) Foreign Application Priority Data

Nov. 2, 1998 (DE) .............................................. 198 50 416

(51) Int. Cl.[7] .......................... G01G 21/28; G05B 13/02; G06F 15/18
(52) U.S. Cl. .......................... 177/180; 177/240; 177/243; 177/181; 700/28; 700/84; 700/302; 706/14; 708/144
(58) Field of Search .................................... 177/180, 181, 177/240, 241, 242, 243, 25.11, 25.13; 700/28, 84, 302; 706/14; 708/144, 145, 146

(56) References Cited

U.S. PATENT DOCUMENTS

| 4,700,793 | 10/1987 | Luechinger | 177/181 |
|---|---|---|---|
| 4,789,034 | * 12/1988 | Lüchinger et al. | 177/181 |
| 4,798,250 | 1/1989 | Knothe et al. | 177/181 |
| 4,862,401 | * 8/1989 | Kibli et al. | 177/25.11 |
| 5,058,692 | 10/1991 | Melcher et al. | 177/181 |
| 5,152,356 | * 10/1992 | Strickler et al. | 177/180 |
| 5,567,918 | * 10/1996 | Bachmann et al. | 177/25.13 |
| 5,589,670 | * 12/1996 | Berli | 177/25.13 |
| 5,841,076 | * 11/1998 | Schwartz et al. | 177/25.13 |

FOREIGN PATENT DOCUMENTS

| 3741 313 | 7/1988 | (DE) . |
|---|---|---|
| 0 234 008 | 9/1987 | (EP) . |

* cited by examiner

Primary Examiner—Randy W. Gibson
(74) Attorney, Agent, or Firm—Sughrue, Mion, Zinn, Macpeak & Seas, PLLC

(57) ABSTRACT

A balance with a wind guard moved by a motor whereby the position of the moveable walls of the guard are monitored by a sensor. An electronic memory is provided for the desired end position of the moveable wall element. The desired end position of the removable walls can be stored in this memory in a learning phase and when the walls are opened by the motor, they are opened only up to a preselected position. This minimizes the time for opening and closing the weighing area and diminishes exposure to air turbulence within the weighing area.

This intuitively and flexibly assigns wall elements to user keys.

9 Claims, 3 Drawing Sheets

BALANCE WITH MOTOR-DRIVEN WIND GUARD

FIELD OF THE INVENTION

Precision scales with wind guards

BACKGROUND OF THE INVENTION

The invention relates to balances or scales, with an enclosed weighing area which surrounds this balance scale on all sides and which can be opened and closed along at least part of one side by shifting a moveable wall element and with control electronics for the moveable wall element and with control electronics for the drive motor.

Balances with wind guards are known. For example, DE-OS 37 41 313 describes such a balance which comprises a cylindrical wind guard, and EP 0 234 008 describes a balance with a boxlike wind guard.

A disadvantage of these known balances is the fact that the time required for a complete opening and closing of the weighing area by the motor is relatively long and additional time must pass before air turbulence in the weighing area has completely subsided after the closing of the wind guard.

Other balances or scales with wind guards with at least two moveable wall elements, which can be opened or closed either by hand or by a motor, with a display unit, an electronic control, and an opening control buttons, whereby at least two of the opening keys are assigned to the motor-operation of the wind guard.

A balance of this type is known from U.S. Pat. No. 5,058,692 to Melcher et. al. In U.S. Pat. No. 5,058,692 a learning phase is described, which is activated by the operation of a key or a combination of keys and by which the desired end position of the wind guard at opening will be stored.

A disadvantage of this known balance is the fact that the assignment of the moveable wall elements to the operating keys is not very flexible and that the activation of the learning phase requires an additional key or the remembering of a specific combination of keys.

The invention has the object of designing a balance with a motor driven wind guard in such a manner that the opening and closing of the weighing area is faster and there is diminished subsequent air turbulence.

SUMMARY OF THE INVENTION

In order to give the operator a flexible arrangement of the moveable wall elements using the operating or control element and to enable the synchronous opening of various wall elements, it is known from U.S. Pat. No. 4,700,793 to provide slidable connecting bars between the individual wall elements and the operating element, which will connect the wall elements with each other and with the operating element. However, this mechanical solution is costly to manufacture and again requires a conscious intervention of the operator to engage or disengage the corresponding connecting bars. Furthermore, only a single combination of wall elements can be entered; any other combination requires a new sliding of connecting bars.

It is, therefore, an object of the present invention to provide a flexible arrangement between the individual moveable wall elements and the pressed keys, without the use of hand-operated connecting bars, with the fewest keystrokes and where the learning phase completes practically unnoticed by the operator.

In accordance with the present invention this is achieved by assigning a memory to each operating key, in which the wall element(s) to be opened or closed by this key is/are stored, by providing a detector for each movable wall element, which will detect the manual operation of the corresponding wall element effected by the operator of the balance and by the activation of a learning phase as the response to at least one of the detectors.

Furthermore, the operation of a key in this learning phase stores the moveable wall element(s) that is/are open at the moment and is/are herewith assigned to the pressed key(s) and the learning phase is herewith finalized.

Therefore, the assignment of the operating keys to the individual moveable wall elements is not preprogrammed, but stored during a learning phase in a storage. The learning phase is started automatically when either one or more moveable wall elements is/are pushed open by hand, and it is switched off automatically when this/these wall element(s) is/are closed by pressing an operating key.

BRIEF DESCRIPTION OF THE DRAWINGS

Preferred embodiments of the apparatus of this invention will be described in detail below in connection with the following drawings, in which like numbers refer to like components.

DETAILED DESCRIPTION OF THE PREFERRED EMBODIMENT

Figure 1:
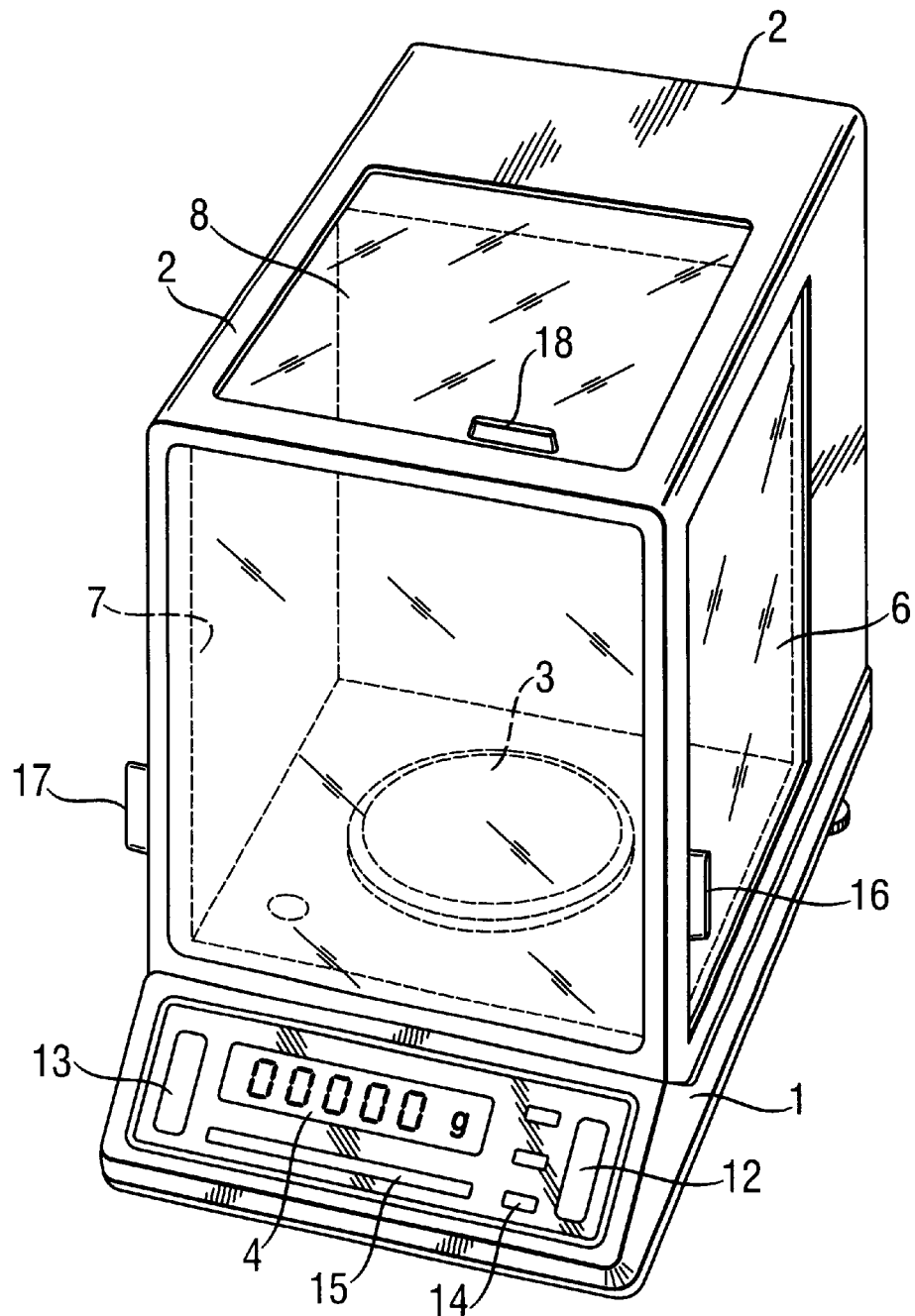
FIG. 1 is a perspective view of balance with a wind guard according to the present invention.

The perspective view of the balance in FIG. 1 shows a lower housing 1 of the balance, the balance pan 3 and the wind guard 2 to protect the balance scale and the to be weighed material from air drafts in the environment. The wind guard 2 shows moveable wall elements 6 and 7 on the right and left hand side respectively, which can be slid by hand by means of handles 16 and 17, respectively attached. Also, the upper closing element 8 is slidable by means of a handle 18. The display of the weighing results takes place in a display unit 4. For the operation of the balance, a tare key 15 for zero-setting the display and other keys 14 are present, for example to switch units of measurement and/or to order a print-out to an attached printer. Balances of this type are generally known, thus they do not have to be described here in detail. The principles of the actual recording of the measured data is not relevant for the invention, therefore its description can also be waived; a preferred embodiment uses, for example, the principles of electromagnetic power compensation.

The moveable wall elements 6, 7, and 8 can be slid not only by hand, but also by motor. The motor(s) that is/are required for this cannot be seen by the operator of the balance and is/are therefore not shown in FIG. 1. To trigger the sliding by means of a motor, two keys 12 and 13 are present, which function is explained in detail below.

Figure 2:
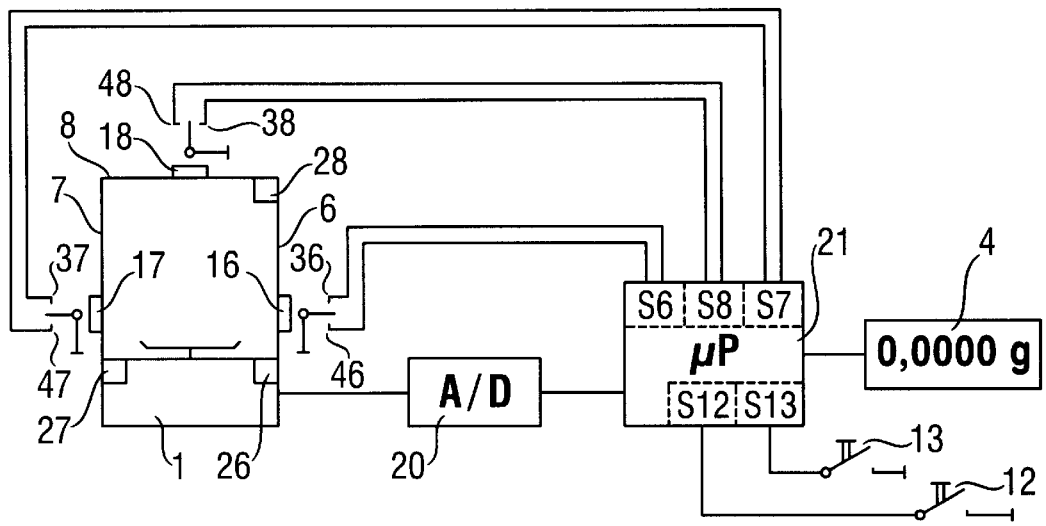
FIG. 2 is a schematic block diagram of electronic circuitry of the present invention.

FIG. 2 shows the schematic block diagram of the electronic circuitry of the balance, in which the parts that are irrelevant to this invention are only outlined. On the left hand side, the lower housing 1 with the balance scale 3 and with the movable wall elements 6, 7, and 8 are schematically outlined. In the signal path of the balance, an Analog/Digital (A/D) converter 20 is available behind the actual recorder of measured data, (e.g. the electromagnetic force compensation unit) a microprocessor 21 for digital signal processing and the display unit 4 are also present. In addition, keys 12 and 13 for the triggering of the motor-driven movement of the wall elements 6, #7, and 8 are shown, whereas keys 14 and 15 have been omitted for lucidity. Furthermore, handles 16, #17, and 18 show built-in detectors; in FIG. 2 this is only shown by spatial closeness. Handle 16, for example, shows a detector 36, which responds to the opening by hand of the wall element 6, and a detector 46, which responds to the closing by hand. In the same way, handles 17 and 18 each show detectors 37 and 47, or 38 and 48 respectively. Probes 36, 37, and 38 respond to the opening and probes 46, 47, and 48 to the closing.

These detectors serve to assist the desired sliding of the movable wall elements by means of a motor. For example, if the operator applies a little opening pressure to the left wall element 7 by the handle 17, detector 37 responds and the electronics control in the microprocessor 21 starts the motor 27 for the opening of wall element 7.

Therefore only a light tap of handle 17 in the opening direction is needed and the electronics open the movable wall element 7 completely. The same applies to closing. The propulsion motor to slide the wall element 6 is marked with 26, the motor (propulsion motor) for wall element 8 with 28. The motors, including gearing and gear rack or pinion are only outlined, since these drive trains are generally known; the steering conduit for the motors have been omitted for lucidity reasons. Detectors 36, 37 and 38 are also employed for the activation of the learning phase, as described next in accordance with FIG. 3.

Figure 3:
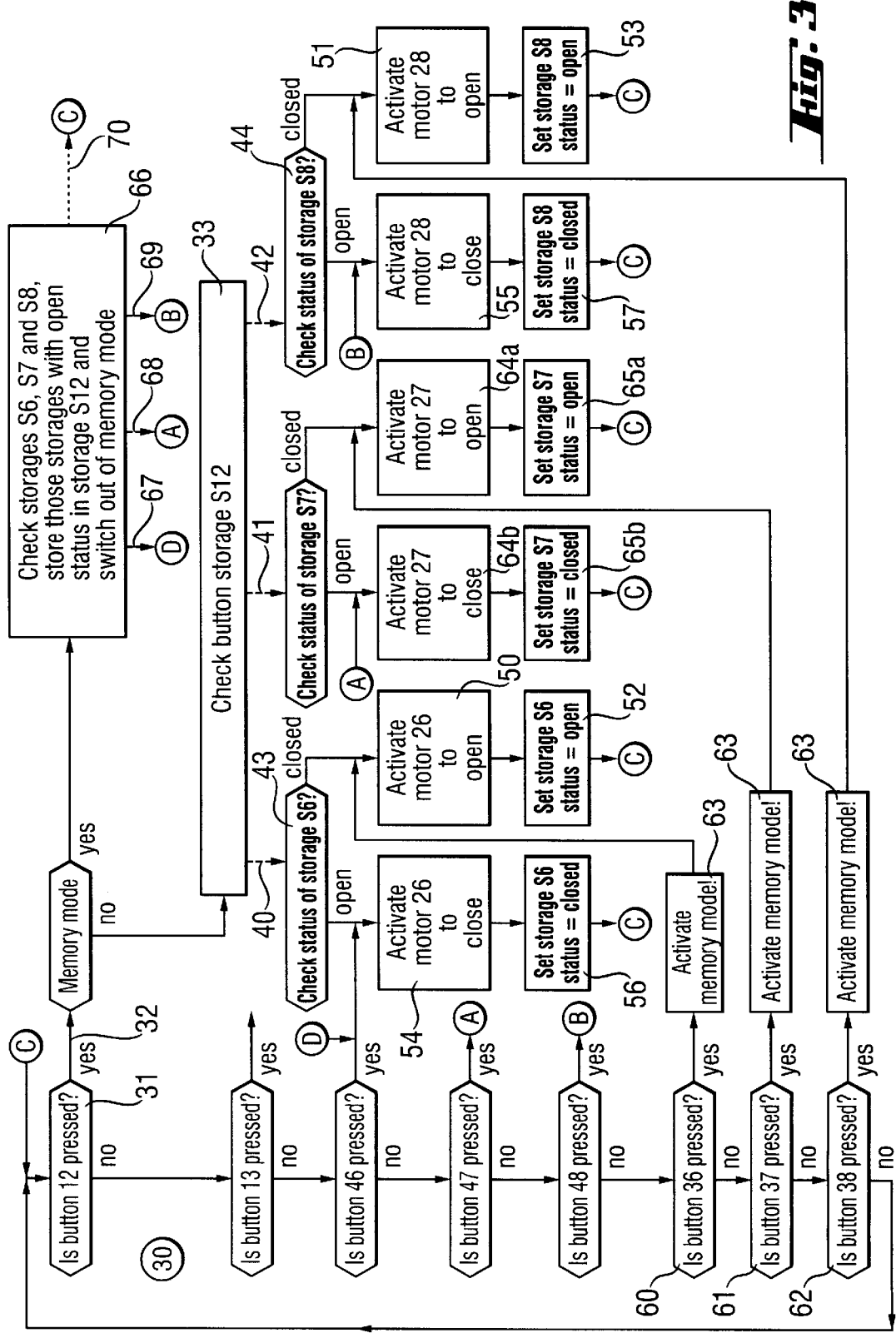
FIG. 3 is a view of a flow chart of the electronics in FIG. 2 of the present invention.

The flow chart in FIG. 3 shows the steering of the motor-powered sliding of the movable wall elements using keys 12 and 13. Keys 12 and 13, as well as probes 46, 47, 48, 36, 37 and 38, are constantly supervised by the electronics control of the program in the microprocessor 21. As long as no keys or probes are operated, the electronics control remains in the closed loop 30 on the left hand side of FIG. 3. If, for example, key 12 is operated (step 31), path 32 will be pursued, the program will question if the learning phase is activated (which is generally not the case), and reach step 33 releasing storage S12, which is assigned to key 12. Storage S12 is located in the control unit in the microprocessor 21 and consists of as many storage fields as movable wall elements are present, thus in our example this translates to three. If key 12 had been assigned to the two movable wall elements 6 and 8 in a prior learning phase, steps 40 and 42 would be activated among the three possible steps 40, 41, and 42 (illustrated by a broken line in FIG. 3). If, for example, all movable wall elements are closed, the release of storages S6 and S8 (steps 43 and 44) will in both cases result in the answer "closed" (storages S6, S7, and S8 are also maintained in the microprocessor 21). Therefore, motor 26 will be activated to open the wind guard 6 (step 50) and motor 28 to open the wall element 8 (step 51). After finalizing the motor-operated opening process, the status for both movable wall elements 6 and 8 in storage S6 and in storage S8 will be changed to "open" (step 52 and step 53). Subsequently, the program returns to loop 30 and again oversees the keys and probes. If key 12 is operated again, for example, paths 32 as well as 40 and 42 will again be pursued.

However, the status of storages S6 and S8 are now "open", so that motor 26 will be activated to close (step 54) as well as motor 28 (step 55). Subsequently, the status of storages S6 and S8 will be set to "closed" (steps 56 and 57). In this way, the wind guard on the right hand side and on top can be opened and closed as many times as desired by operating key 12.

Operation of motor 27 to open (step 64a) and close (step 64) wall element 7 and thereby set storage S7 to open (step 65a) and closed (step 65b), respectively, is similar to the description above. On conclusion, if the storage S7 is set to open, motor 27 will likewise be activated to close wall element 7.

In this same way, if key 13 is operated, the wall element assigned hereto (and stored in S13) or the assigned and stored wall elements are opened and closed. The corresponding program tracking is briefly described for simplicity being similar since it is built exactly as sketched and described for key 12. If, for example, the operator of the balance has assigned key 13 to the wall element 7, wall element 7 can be opened and closed by pressing key 13, while wall elements 6 and 8 can be opened and closed synchronously by pressing key 12. However, this arrangement is only preferred embodiments. In the same way, key 12 can be assigned only to the movable wall element 6 and key 13 to the upper wall element 8; or key 12 is assigned to the left wall element 7 and key 13 to the right wall element 6; or key 12 is assigned to the right wall element 6 and key 13 is assigned to all three wall elements. Depending on the application, both keys 12 and 13 can be assigned to either way of opening of the movable wall elements and this can be triggered as often as desired. The elected way is in each case stored in the storage fields S12 and S13.

In the preceding cases it has been assumed that the operator of the balance had previously programmed the desired arrangement between keys 12 or 13 and either one or more of the movable wall elements. This programming takes place in the learning phase, where storages S12 and S13 are set for keys 12 and 13. In order to simplify this learning process as much as possible, the learning phase is activated by the electronic control 21 (step 63 in the flow chart in FIG. 3), as soon as at least one of the probes 36, 37 and 38 responds (steps 60, 61 and 62), which means as soon as the operator of the balance opens one of the movable wall elements 6, 7, or 8 by hand. As already described above, the corresponding motor 26, 27, or 28 is activated to completely open the wall element (steps 50, 64, and/or 51) and the corresponding storage S6, S7, or S8 adopts the status "open" accordingly (steps 52, 65, or 53). If either key 12 or 13 is pressed after manually opening (with the assistance of a motor) the desired wall elements, for example, key 12 (step 31) is pressed, the program goes into the learning phase to box 66, scans storages S6, S7 and S8 and stores that/those storages in the key storage S12, which are stored with the status "open".

The learning phase is already finalized. Via one or more of the paths (sketched in FIG. 3 by broken lines) 67, 68, and/or 69, the motor(s) of the open wall element(s) is/are activated and closed. Thus, the operator of the balance opens by hand only the desired wall elements and subsequently closes them by pressing the elected corresponding key 12 or 13 and this arrangement is stored for the future. By this means, the customer is hardly aware of this learning process, he only needs to show the balance the correct procedure once and the balance will repeat this as often as desired upon pressing a key.

The above described hardware and the program of the electronic control 21 can obviously be modified in many details. For example, instead of the probes 36, 37, 38, 46, 47, and 48 as detectors for the hand movement, solenoid can be attached to the movable wall element or to its motor-operated drive-train. If the movable wall element is slid, the solenoid pushes and sends a signal for the direction of the movement, thus the same information is available as in the arrangement with the detectors in the control handle according to FIG. 2. Or, as a detector for the hand movement, the tension induced by motor 26, 27, or 28 is utilized, whereby the sign of this tension would indicate the direction of the movement. An end switch, which is closed when the position of the corresponding wall element is closed, can equally serve as a detector for the hand movement: If the end switch opens the corresponding wall element, without the electronics having issued an order to open same, a hand movement is inferred.

In FIG. 3, the flow chart of the electronics shows the end of the learning phase through steps 67, 68 and 69 with broken lines, which triggers the motors, the wall elements of which were open during the learning phase, to close. There is, however, the possibility to finalize the learning phase without the motor-driven closing of the movable wall elements. This alternative is indicated via a dotted line in FIG. 3 by steps 70. According to use, one option may be more favored than the other.

Figure 4:
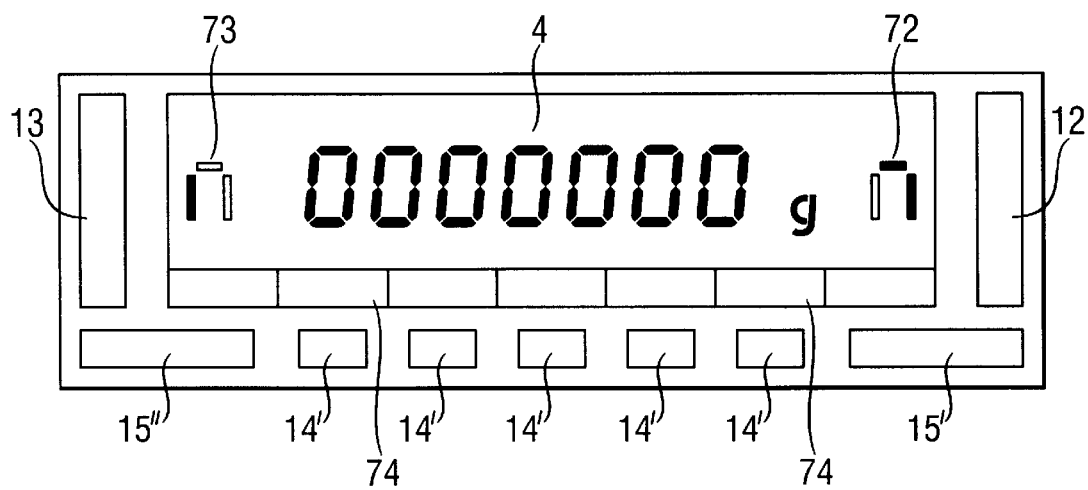
FIG. 4 is a view of the display unit and the operating keys of the balance in an alternative embodiment.

FIG. 4 shows the display unit and the operating keyboard of the balance in a second embodiment. The parts in this figure that also appear in FIG. 1 have the same reference numbers. The display unit indicates on each side of display 4 of the weighing results, close to keys 12 and 13, a symbolic display 73 and 72 of the wind guard with its movable wall elements 6, 7 and 8. The wall elements are presented as open rectangles. These rectangles appear solid when the corresponding movable wall element is stored in the respective storage S12 or S13 and thus assigned to this key. The example of FIG. 4 shows specifically that by operating key 12, the right movable wall element 6 and the top movable wall element 8 will be opened or closed respectively; by operating key 13, the left movable wall element 7 will be opened or closed respectively. Furthermore, the display unit in FIG. 4 shows compartments 74 in its lower portion, which are situated directly above keys 14' and can be arranged to show different displays for these keys 14', in order to utilize these keys in different balance applications for different functions and in each case providing the corresponding display according to the software been used. In addition, the option in FIG. 4 shows the division of the tare-key in two parts 15' and 15", as to facilitate a taring with the left hand as well as with the right hand.

The above described forms of implementation can obviously be complemented and modified in numerous ways. It is possible, for example, to combine the open assignable key arrangement of this invention and the automatic learning phase with the sensor known from DE 39 19 870 C1 for the position of the movable wall element and the programmable end position at opening. This sensor can at the same time serve as detector for the detection of hand movement. The motor-assisted opening by hand, as described above, is obviously inapplicable in this combination. If required, it is also possible to provide more than two keys to store more than two different variations to open the movable wall elements and to recall the same. It is also possible to expand this principle to more than three movable wall elements. It is likewise possible to activate the learning phase not only by sliding open by hand, that is by a signal from detectors 36, 37, or 38, but also by sliding closed by hand, that is by a response of detectors 46, 47, or 48. In case one or more wall elements is assigned to one key it is possible, due to different frictions, that the wall elements do not reach their end position at the same time, although they started their opening or closing process at the same time. To avoid this, a favorable further development of this invention is contemplated to include resources in the digital signal processor 21, which detect the time differences in reaching respective end positions and which will reduce the supply of tension of the faster motor or increase the supply of tension of the slower motor at the next opening/closing process, in case a time difference is detected. If the change in tension is at first chosen too small or too large, the supply of tension will be adjusted accordingly at the next opening/closing process. Thus, a constant adjustment is guaranteed even with changing friction coefficients.

What is claimed is:

1. A scale with a display comprising:

A wind guard comprising at least two moveable wall elements that can be opened by hand or with a motor extending above said scale;

at least two operating keys to control said motors, each of said operating keys storing a list of said wall elements to open and close;

at least one detector for each of said wall elements that detects pressure on said wall element by a user of the scale; and computer control means that enters a learning mode in response to a signal from said detector and stores said list of said wall elements for one of said operating keys.

2. The scale of claim 1 wherein said detector comprises a button in a handle of said wall element.

3. The scale of claim 1 wherein said detector comprises a signal generator in said movable wall element or in said motor.

4. The scale of claim 1 wherein said detector comprises a torque detector in said motor which detects a torque induced by said pressure by said user.

5. The scale of claim 1 wherein said detector comprises a latch on said movable wall element that detects when said movable wall element is closed.

6. The scale of claim 1 wherein, upon pressing one of said operating keys, at least one movable wall element is closed by said motor.

7. The scale of claim 1 wherein said display depicts which of said movable wall elements is in said list for each of said operating keys.

8. The scale of claim 1 wherein said motor opens a corresponding one of said wall elements in response to a signal from one of said detectors resulting from said pressure on said wall element by said user.

9. The scale of claim 1 further comprising a coordination program in said computer that decreases the torque applied by the faster motor if two wall elements reached open or closed positions at different times.

* * * * *